(12) United States Patent
Mathieu

(10) Patent No.: US 7,416,318 B2
(45) Date of Patent: Aug. 26, 2008

(54) SIGNALING ASSEMBLY

(75) Inventor: Daniel J. Mathieu, Sheboygan Falls, WI (US)

(73) Assignee: K.W. Muth Company, Inc., Sheboygan, WI (US)

( * ) Notice: Subject to any disclaimer, the term of this patent is extended or adjusted under 35 U.S.C. 154(b) by 195 days.

(21) Appl. No.: 11/326,058

(22) Filed: Jan. 5, 2006

(65) Prior Publication Data

US 2007/0153536 A1    Jul. 5, 2007

(51) Int. Cl.
*B60Q 1/26* (2006.01)
(52) U.S. Cl. ...................... 362/492; 362/494
(58) Field of Classification Search ................. 362/494, 362/297, 540–542, 545, 548, 516–518, 296–305, 362/492
See application file for complete search history.

(56) References Cited

U.S. PATENT DOCUMENTS

| | | | |
|---|---|---|---|
| 5,014,167 A | 5/1991 | Roberts | |
| 5,361,190 A * | 11/1994 | Roberts et al. | 362/464 |
| 5,481,409 A | 1/1996 | Roberts | |
| 5,788,357 A | 8/1998 | Muth et al. | |
| 6,005,724 A | 12/1999 | Todd | |
| 6,045,243 A | 4/2000 | Muth et al. | |
| 6,076,948 A | 6/2000 | Bukosky et al. | |
| 7,008,091 B2 * | 3/2006 | Mathieu et al. | 362/494 |
| 2006/0291225 A1 * | 12/2006 | Todd et al. | 362/494 |

* cited by examiner

*Primary Examiner*—Bao Q Truong
(74) *Attorney, Agent, or Firm*—Wells St. John P.S.

(57) ABSTRACT

A signaling assembly is described and which includes a semi-transparent mirror; a reflector housing, defining a cavity, and which is juxtaposed relative to the semitransparent mirror; and an electromagnetic radiation emitter positioned in the reflector housing and which, when energized, predominantly emits visibly discernable electromagnetic radiation which travels substantially, laterally, outwardly relative to the emitter, and which is reflected by the reflector housing so as to subsequently pass through the semitransparent mirror to form a visibly discernable signal.

10 Claims, 2 Drawing Sheets

SIGNALING ASSEMBLY

TECHNICAL FIELD

The present invention relates to a signaling assembly, and more specifically to a signaling assembly which, when energized, emits visibly discernable electromagnetic radiation which travels substantially laterally outwardly therefrom to form a visibly discernable signal.

BACKGROUND OF THE INVENTION

The prior art is replete with numerous examples of various visual warning devices which have been utilized on overland vehicles, and the like, and which are effective to provide a visual signal which indicates to adjoining vehicles that the overland vehicle is about ready to change lanes, brake or otherwise engage in a maneuver which might effect the adjoining vehicle. Examples of prior art visual signaling devices are seen in U.S. Pat. Nos. 5,014,167; 5,481,409; 5,361,190; 5,788,357; 6,045,243; and others. In U.S. Pat. Nos. 6,005,724 and 6,076,948, the inventors have disclosed other arrangements for visual signaling assemblies which include providing a semitransparent mirror having a region through which an emitted visual signal may pass. The mirrors as described in these two patents have an acceptable amount of reflectivity while providing a region which passes visibly discernable electromagnetic radiation in an amount so as to form a visual signal that can be seen by adjacent drivers.

While all the prior art references noted above have worked with a great deal of success, the inventor has endeavored to continually develop new visual signaling assemblies which are lighter in weight; have a reduced thickness dimension; and which utilize various light emitting devices to provide a number of benefits which were heretofore, unknown. Those skilled in the art have long recognized that the space available to position a visual signaling assembly within a mirror housing, for example, is quite limited. Further, the dissipation of heat generated by any light emitting assembly within a mirror housing continues to be a concern in the design of such assemblies.

Therefore, a visual signaling assembly which avoids the shortcomings attendant with the prior art assemblies utilized heretofore is the subject matter of the present application.

SUMMARY OF THE INVENTION

A first aspect of the present invention relates to a signaling assembly which includes a semitransparent mirror having forward and rearward facing surfaces; a reflector housing, defining a cavity, and which is juxtaposed relative to the rearward facing surface of the semitransparent mirror; and an electromagnetic radiation emitter positioned within the cavity of the reflector housing and which, when energized, predominantly emits visibly discernable electromagnetic radiation which travels substantially laterally, outwardly relative to the electromagnetic radiation emitter, and which is reflected by the reflector housing so as to subsequently pass through the semitransparent mirror to form a visibly discernable signal.

Still further, another aspect of the present invention relates to a signaling assembly which includes a semitransparent mirror having a region through which electromagnetic radiation may pass, and wherein the semitransparent mirror has forward and rearward facing surfaces; a substantially opaque masking layer borne by the rearward facing surface of the semitransparent mirror, and which defines, at least in part, the region through which the electromagnetic radiation may pass; a reflector housing defining first and second cavities and which is disposed in rested receipt thereagainst the rearward facing surface of the semitransparent mirror, and which further defines an aperture which communicates with the first cavity; and a light emitting diode positioned, at least in part, within the first and second cavities, and which is located in rested receipt thereagainst the rearward facing surface of the semitransparent mirror, and wherein the light emitting diode emits, when energized, electromagnetic radiation which travels substantially laterally, outwardly relative to same, and wherein the substantially laterally emitted electromagnetic radiation is reflected by the portion of the reflector housing defining the first cavity and travels through the first aperture so as to pass through the semitransparent mirror and form a visibly discernable signal.

Yet further, another aspect of the present invention relates to a signaling assembly which includes a semitransparent mirror having forward and rearward facing surfaces; a substantially opaque masking layer borne by the rearward facing surface of the semitransparent mirror, and which defines, at least in part, a region through which electromagnetic radiation may pass therethrough; a reflector housing having a reflector cavity which is defined by a plurality of reflector facets, and wherein the reflector housing defines a first aperture which communicates with the reflector cavity, and wherein the substantially opaque masking layer is disposed, at least in part, in covering relation relative to the first aperture, and wherein the reflector housing is positioned in rested receipt thereagainst the rearward facing surface of the semitransparent mirror, and further has a second cavity which communicates with the first cavity; a circuit board having forward and rearward facing surfaces, and which has an aperture formed therein and wherein the circuit board is mounted within the second cavity; and a light emitting diode which is electrically mounted to the rearward facing surface of the circuit board and which extends, at least in part, through the aperture defined by the circuit board and into the reflector cavity, and wherein the light emitting diode further rests thereagainst the rearward facing surface of the semitransparent mirror, and wherein the light emitting diode, when energized, emits electromagnetic radiation which travels substantially laterally, outwardly relative to the light emitting diode and is then reflected by the reflector facets such that it may pass through the region of the semitransparent mirror which passes electromagnetic radiation.

These and other aspects of the present invention will become more apparent hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
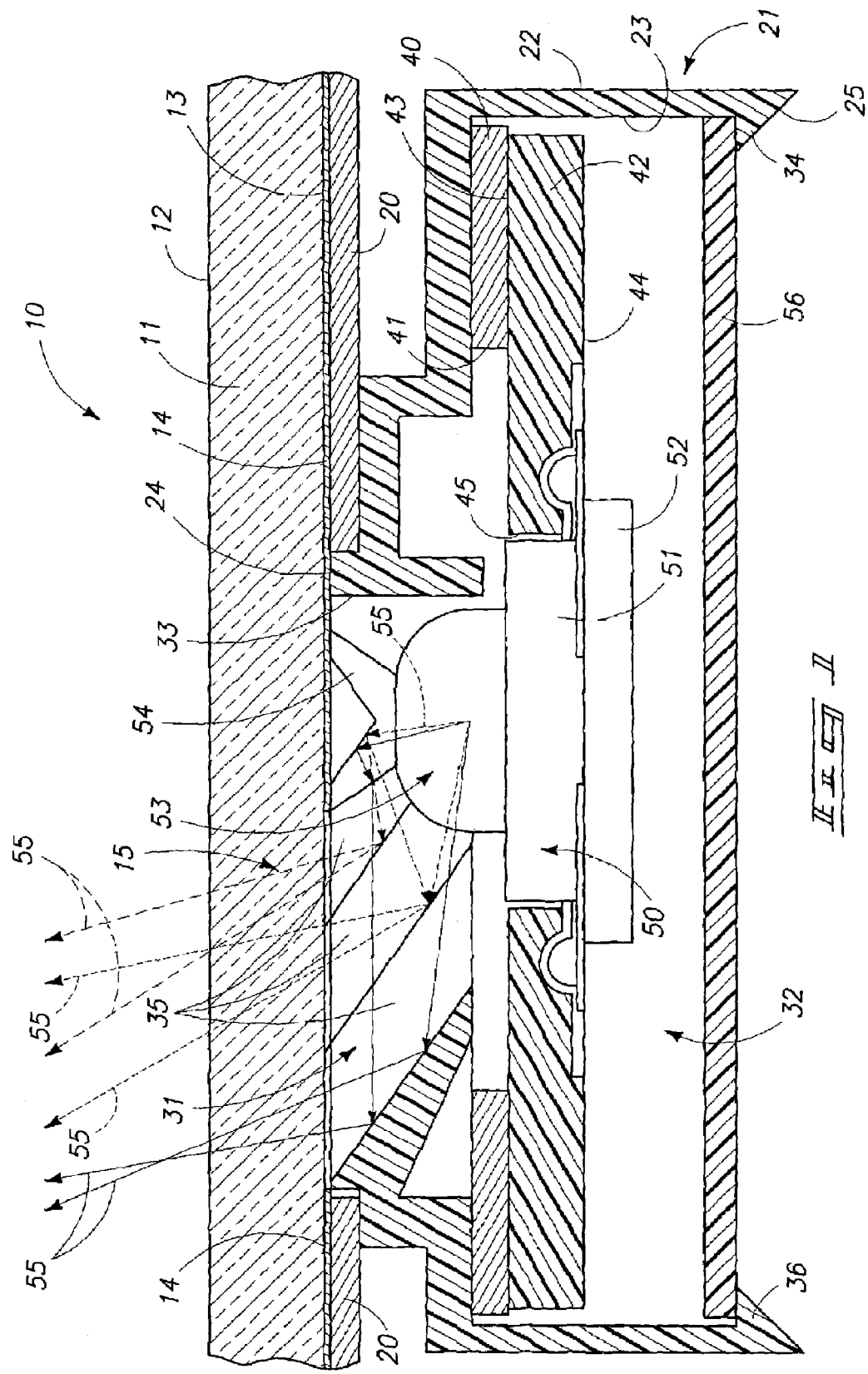
FIG. 1 is a fragmentary, transverse, vertical sectional view taken through a signaling assembly of the present invention and showing a first pattern of emitted light.
Figure 2:
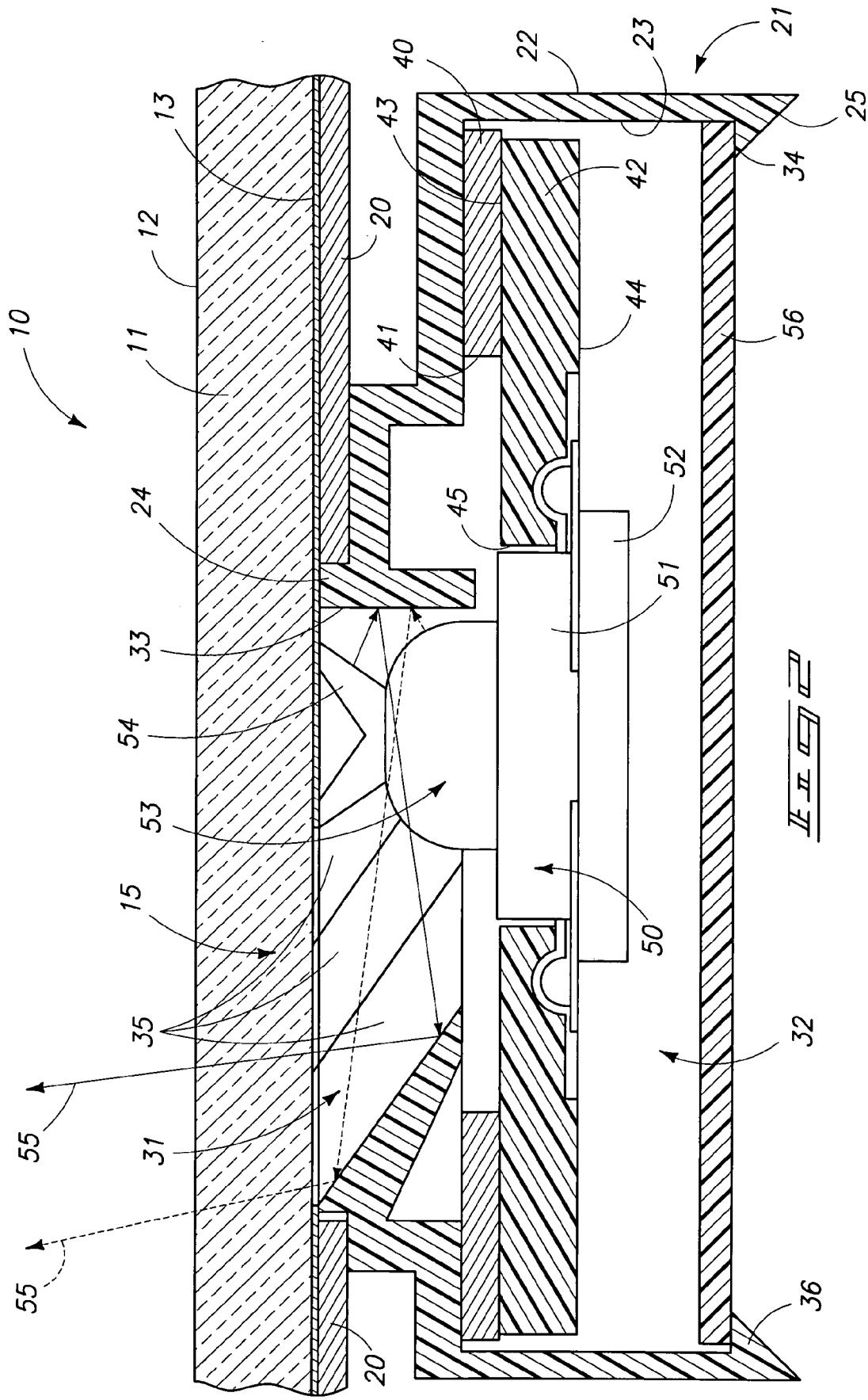
FIG. 2 is a fragmentary, transverse, vertical sectional view of a signaling assembly of the present invention and showing a second pattern of emitted light.

Referring more particularly to the drawings, the signaling assembly of the present invention is generally indicated by the numeral 10 in FIGS. 1 and 2, respectively. As seen in those drawings, the signaling assembly 10 of the present invention includes a semitransparent mirror 11 that has a forwardly facing surface 12, and an opposite rearwardly facing surface 13. The semitransparent mirror is selected from the group comprising substantially neutrally chromatic mirrors; dichroic mirrors; and/or electrochromic mirrors. The semitransparent mirror has an opaque masking layer 14 which is applied to the rearwardly facing surface 13 thereof. The masking layer substantially impedes the passage of visible light therethrough. The opaque masking layer defines a region 15 through which a visibly discernable electromagnetic radiation signal may pass. While one region is shown herein, it should be understood that the region 15 may comprise a plurality of smaller apertures which are appropriately positioned in order to form a visible signal having a predetermined appearance. The semitransparent mirror 11 typically has a reflective coating applied to the rearwardly facing surface 13. In the arrangement as seen in FIGS. 1 and 2, the opaque masking layer may comprise the reflective coating, or may be applied over the reflective coating. In the latter arrangement, the reflective coating would be removed in the region 15 through which the electromagnetic radiation may pass. In another possible arrangement, the reflective coating in the region 15 may be deposited in a reduced thickness so as to pass an increasing amount of visibly discernable electromagnetic radiation therethrough.

As seen in FIGS. 1 and 2, and juxtaposed relative to the opaque masking layer 14 is an adjacent substantially conforming layer 20 which may comprise a foam adhesive, or an adjacent heater assembly. For purposes of the present application, the adjacent layer 20 will be referred to hereinafter as a layer of foam adhesive and which is useful in affixing the present invention 10 in an appropriate orientation relative to the region 15. Adhesive layer 20 is affixed to the opaque masking layer 14, and is operable to affix a reflector housing generally indicated by the numeral 21 in an appropriate orientation relative to the region 15. The reflector housing 21 as seen in FIGS. 1 and 2, is defined by an outside surface 22, and an opposite inside facing surface 23. Still further, the housing has a first end 24 which is juxtaposed relative to the rearwardly facing surface 13 of the semitransparent mirror 11, and an opposite second end 25. As seen in the drawings, a portion of the outside facing surface 22 is adhered to the adjacent foam adhesive layer 20 thereby affixing the reflector housing 21 in an appropriate orientation relative to the region 15 through which a visibly discernable electromagnetic radiation signal may pass.

As seen in FIGS. 1 and 2, the reflector housing 21 defines a first reflector cavity 31 which is positioned near and communicates with the first end 24 thereof, and a second cavity 32 which is positioned near and which communicates with the second end thereof 25. As seen in the drawings, the first reflector cavity 31 is defined, at least in part, by a plurality of reflector facets 35. Further, the reflector housing 21 is defined by a first aperture 33 which communicates with the first reflector cavity 31. Further, as seen in the drawings, the substantially opaque masking layer 14 is disposed, at least in part, in covering relation relative to the first aperture when the housing is appropriately positioned. Still further, and as seen in the drawings, the second cavity 32 communicates with the first reflector cavity 31. It will be seen that a flange 36 is positioned near the second end 25 of the reflector housing and extends inwardly relative thereto, and substantially defines or circumscribes the second aperture 34 which communicates with the second cavity 32. Still further, as seen by reference to FIGS. 1 and 2, it will be seen that the first reflector cavity 31 is smaller in size, relatively speaking, to the second cavity 32.

As seen in the drawings, the present invention 10 includes a second foam adhesive layer 40 which is received within the second cavity 32, and which is affixed to the inside facing surface 23 of the reflector housing 21. The second foam adhesive layer has an aperture 41 formed therein and which is substantially aligned so as to permit communication between the first reflector cavity 31 and the second cavity 32. The second foam adhesive layer is operable to affix a circuit board 42 in an appropriate orientation in the second cavity 32. The circuit board, which is electrically coupled to the controls of an overland vehicle, or the like, is a substantially rigid substrate which has a forwardly facing surface 43 which is appropriately affixed to, at least in part, the second foam adhesive layer, and an opposite rearwardly facing surface 44. Still further, the circuit board 42 has an aperture 45 formed therein, and which is substantially aligned relative to the first reflector cavity 31.

As seen in FIGS. 1 and 2, the present invention 10 includes an electromagnetic radiation emitter 50, here illustrated as a side emitting, light emitting diode and which is positioned, at least in part, within the reflector cavity 31, and which when energized, predominately emits visibly discernable electromagnetic radiation which travels substantially laterally, outwardly relative to the electromagnetic radiation emitter 50 and which is reflected by the reflector housing 21 so as to subsequently pass through the region 15 of the semitransparent mirror 11 so as to form a visibly discernable signal. The pattern of emitted visibly discernable electromagnetic radiation will be discussed in greater detail hereinafter. As seen in the drawings, the electromagnetic radiation emitter, here illustrated as a side emitting, light emitting diode, includes a base portion 51 which is mounted to the rearwardly facing surface 44 of the circuit board 42. The base portion 51 comprises, at least in part, a heat sink 52. As illustrated, the base portion 51 extends through and substantially occludes the aperture 45 which is formed in the circuit board. Mounted on or atop the base portion 51 is a light emitting portion 53 which has a given height and width dimension. Mounted atop the light emitting portion 53 is a reflector portion 54. As seen in the drawings, the light emitting diode, and more specifically the top portion thereof rests thereagainst the opaque masking layer 14 and which extends in substantially covering relation over at least a portion of the first reflector cavity 31. As should be understood, the opaque masking layer substantially impedes or prevents the passage of any significant amount of visibly discernable electromagnetic radiation therethrough. In the arrangement as seen, the light emitting diode, when energized, emits electromagnetic radiation 55 which travels substantially laterally outwardly relative to the light emitting diode 50. A preponderance of the emitted electromagnetic radiation is then reflected by the individual reflector facets 35 such that it may pass through the region of the semitransparent mirror 15 which passes electromagnetic radiation.

In the arrangement as seen in the drawing, the heat sink extends outwardly relative to the rearwardly facing surface 44 of the circuit board 42 so as to effectively radiate heat energy into the second cavity 32. Still further, and as should be appreciated by a study of the drawings, the first reflector cavity 31 has a depth dimension which is just greater than the height dimension of the light emitting portion 53 of the electromagnetic radiation emitter 50. As will be appreciated from the drawings, the electromagnetic radiation emitter 50 is electrically coupled to the controls of the overland vehicles (not shown) and which can be selectively energized in order to generate the electromagnetic radiation 55 which travels laterally outwardly relative to same. As seen in the drawings, the second aperture 34 is substantially occluded by means of a back plate 56 which rests thereagainst the flange 36 and is captured by the reflector housing 21. As should be appreciated, the back plate 56 may be periodically removed in order to service the circuit board and the electromagnetic radiation emitter which is mounted on same.

Operation

The operation of the described embodiment of the present invention is believed to be readily apparent and is briefly summarized at this point.

A signaling assembly 10 of the present invention is best understood by a study of FIGS. 1 and 2, and includes a semitransparent mirror 11 having forward and rearward facing surfaces 12 and 13; a reflector housing 21, defining a cavity 31, and which is juxtaposed relative to the rearward facing surface of the semitransparent mirror; and an electromagnetic radiation emitter 50 positioned within the cavity of the reflector housing and which, when energized, predominantly emits visibly discernable electromagnetic radiation 55 which travels substantially laterally, outwardly relative to the electromagnetic radiation emitter, and which is reflected by the reflector housing so as to subsequently pass through the semitransparent mirror 11 to form a visibly discernable signal. In the arrangement as seen in the drawings, the electromagnetic radiation emitter is a side-emitting light emitting diode which rests in juxtaposed relation thereagainst the rearward facing surface 13 of the semitransparent mirror 11. In the arrangement as seen in the drawings, the reflector housing defines an aperture 33 which permits visibly discernable electromagnetic radiation 55 to pass therethrough. Still further, the signaling assembly 10 further comprises a substantially opaque masking layer 14 which is borne by the rearward facing surface 13 of the semitransparent mirror 11. The opaque masking layer partially occludes the aperture 33 so as to prevent visibly discernable electromagnetic radiation to pass therethrough. In addition to the foregoing, the signaling assembly 10 of the present invention includes a circuit board 42 which is received within the cavity 32 of the reflector housing, and which electrically mounts the electromagnetic radiation emitter 50. In the arrangement as seen in the drawings, the electromagnetic radiation emitter comprises a base portion 51 which is electrically mounted on the circuit board, and a light emitting portion 53 which is borne by the base portion. The light emitting portion 53 is substantially received within the first reflector cavity 31, and the base portion is positioned remotely relative to the first reflector cavity. In the arrangement as seen, the reflector housing 21 defines a second cavity 32 which receives the base portion 51 of the electromagnetic radiation emitter 50. The base portion includes a heat sink 52 which radiates heat energy generated by the electromagnetic radiation emitter 50 when it is energized. The emitted heat energy is received and dissipated, at least in part, by the second cavity 32. As earlier discussed, the semitransparent mirror 11 may comprise a neutrally chromatic; dichroic; or electrochromic mirror.

Therefore it will be seen that the present invention achieves benefits not provided for in the prior art. In particular, the present invention avoids many of the costs associated with the prior art manufacturing techniques. Still further, the present invention provides design flexibility and decreases the manufacturing costs for this type of visual signaling assembly. Further, the present mirror assembly is highly reliable in operation, and provides superior signaling capability for overland vehicles of various designs.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A signaling assembly comprising:
   a semitransparent mirror having forward and rearward facing surfaces;
   a substantially opaque masking layer which is borne by the rearward facing surface of the semitransparent mirror;
   a reflector housing, defining a cavity, and which is juxtaposed relative to the rearward facing surface of the semitransparent mirror, and wherein the reflector housing defines an aperture which permits visibly discernable electromagnetic radiation to pass therethrough and wherein the opague masking layer partially occludes the aperture so as to prevent visibly discernable electromagnetic radiation to pass therethrough the semitransparent mirror,
   an electromagnetic radiation emitter positioned within the cavity of the reflector housing and which, when energized, predominantly emits visibly discernable electromagnetic radiation which travels substantially, laterally, outwardly relative to the electromagnetic radiation emitter, and which is reflected by the reflector housing so as to subsequently pass through the semitransparent mirror to form a visibly discernable signal, the emitter resting in direct physical contact thereagainst the masking layer; and
   a circuit board received within the cavity of the reflector housing and which electrically mounts the electromagnetic radiation emitter.

2. The signaling assembly of claim 1, wherein the electromagnetic radiation emitter comprises a base portion which is electrically mounted on the circuit board, and an emitter portion which is borne by the base portion, and wherein the emitter portion is substantially received within the reflector housing, and the base portion is positioned remotely relative to the reflector housing.

3. The signaling assembly of claim 2, wherein the reflector housing defines a second cavity which receives the base portion of the electromagnetic radiation emitter, and wherein the base portion includes a heat sink which radiates heat energy generated by the electromagnetic radiation emitter when the electromagnetic radiation emitter is energized, and wherein the emitted heat energy is received and dissipated, at least in part, by the second cavity.

4. A signaling assembly comprising:
   a semitransparent mirror having a region through which electromagnetic radiation may pass, and wherein the semitransparent mirror has forward and rearward facing surfaces;
   a substantially opaque masking layer borne by the rearward facing surface of the semitransparent mirror and which defines, at least in part, the regions through which the electromagnetic radiation may pass;
   a reflector housing defining first and second cavities and which is disposed in rested receipt thereagainst the rearward facing surface of the semitransparent mirror, and which further defines a first aperture which communicates with the first cavity, and wherein the first cavity is a reflector cavity which reflects the substantially laterally emitted electromagnetic radiation in a fashion so as to orient a preponderance of the electromagnetic radiation in a direction so that the preponderance of the electromagnetic radiation may pass through the region of the semitransparent mirror which passes electromagnetic radiation, and wherein the reflector cavity is defined by a plurality of reflector facets, and wherein the opaque masking layer is disposed in partially covering relation relative to the first aperture, a light emitting diode positioned, at least in part, within the first and second cavities and which rests in direct physical contact thereagainst the masking layer, and wherein the light emitting diode emits, when energized, electromagnetic radiation which travels substantially laterally, outwardly relative to same, and wherein the substantially laterally emitted electromagnetic radiation is reflected by the portion of the reflector housing defining the first cavity and travels through the first aperture so as to pass through the semitransparent mirror and form a visibly discernable; and a circuit board received within the second cavity, and wherein the reflector housing further defines a second aperture which permits communication therebetween the reflector cavity and the second cavity, and wherein the circuit board electrically mounts the light emitting diode, and wherein the light emitting diode substantially occludes the second aperture and is positioned, at least in part, within the reflector cavity.

5. The signaling assembly of claim 4 wherein the light emitting diode includes a heat sink which is positioned, at least in part, within the second cavity.

6. The signaling assembly of claim 5, wherein the semitransparent mirror is selected from the group comprising substantially neutrally chromatic mirrors; dichroic mirrors and/or electrochromic mirrors.

7. A signaling assembly comprising: a semitransparent mirror having forward and rearward facing surfaces;

a substantially opaque masking layer borne by the rearward facing surface of the semitransparent mirror, and which defines, at least in part, a region through which electromagnetic radiation may pass therethrough the semitransparent mirror;

a reflector housing having a reflector cavity which is defined by a plurality of reflector facets, and wherein the reflector housing defines a first aperture which communicates with the reflector cavity, and wherein the substantially opaque masking layer is disposed, at least in part, in covering relation relative to the first aperture, and wherein the reflector housing is positioned in rested receipt thereagainst the rearward facing surface of the semitransparent mirror, and further has a second cavity which communicates with the reflector cavity;

a circuit board having forward and rearward facing surfaces, and which has an aperture formed therein and wherein the circuit board is mounted within the second cavity; and a light emitting diode which is electrically mounted to the rearward facing surface of the circuit board and which extends, at least in part, through the aperture defined by the circuit board and into the reflector cavity, and wherein the light emitting diode further rests in direct physical contact thereagainst the masking layer, and wherein the light emitting diode, when energized, emits electromagnetic radiation which travels substantially laterally, outwardly relative to the light emitting diode and is then reflected by the reflector facets such that it may pass through the region of the semitransparent mirror which passes electromagnetic radiation.

8. The signaling assembly of claim 7, wherein the light emitting diode includes a base portion which is formed, at least in part, of a heat sink and a light emitting portion, and wherein the reflector cavity has a depth dimension which is just greater than the length dimension of the light emitting portion.

9. The signaling assembly of claim 8, wherein the base portion is received in the second cavity.

10. A signaling assembly comprising:

a semitransparent mirror having forward and rearward facing surfaces;

a substantially opaque masking layer adhered to the rearward facing surface of the semitransparent mirror, and which defines, at least in part, a region through which visible electromagnetic radiation may pass;

a reflector housing having a reflector cavity which is defined by a plurality of reflector facets, and wherein the reflector housing defines an aperture through which visible electromagnetic radiation may pass, and wherein the aperture is larger than the region of the semitransparent mirror through which visible electromagnetic radiation may pass, and wherein the substantially opaque masking layer is disposed, at least in part, in covering relation relative to aperture so as to partially occlude the aperture and substantially inhibit the passage of at least some visible electromagnetic radiation therethrough;

a side emitting light emitting diode which extends, at least in part into the reflector cavity, and wherein the side emitting light emitting diode includes an integral reflector portion that rests in direct physical contact thereagainst the opaque masking layer which is disposed in partially covering relation relative to the aperture which is defined by reflector housing, and wherein the side emitting light emitting diode, when energized, emits visible electromagnetic radiation which travel substantially laterally, outwardly relative to the side emitting light emitting diode, and is then reflected by the reflector facets such that the emitted visible electromagnetic radiation may pass through the region of the semitransparent mirror which passes the visible electromagnetic radiation, and wherein the integral reflector portion of the side emitting light emitting diode, and the opaque masking layer which is oriented in partial covering relation relative to the aperture defined by the reflector housing, in combination, substantially impede the emitted visible electromagnetic radiation from passing through that portion of the semitransparent mirror covered by the opaque masking layer and which is contact with the side emitting light emitting diode.

* * * * *